United States Patent [19]

Trotel

[11] Patent Number: 5,051,592
[45] Date of Patent: Sep. 24, 1991

[54] PHOTOCONDUCTIVE DETECTORS OF IONIZING RADIATION, AND METHODS OF IMPLEMENTATION

[75] Inventor: Jacques Trotel, Palaiseau, France

[73] Assignee: General Electric CGR SA, Issy les Moulineaux, France

[21] Appl. No.: 515,865

[22] Filed: Apr. 27, 1990

[30] Foreign Application Priority Data

Apr. 28, 1989 [FR] France ................... 89 05667

[51] Int. Cl.$^5$ ............................................. G01T 1/185
[52] U.S. Cl. .................................. 250/387; 250/385.1; 250/389
[58] Field of Search ................... 250/385.1, 389, 374, 250/387; 378/28, 31, 32

[56] References Cited

U.S. PATENT DOCUMENTS 3,898,465  8/1975  Zaklad et al. ................... 250/389
4,810,893  3/1989  Meertens ......................... 250/385

Primary Examiner—Carolyn E. Fields
Assistant Examiner—James E. Beyer
Attorney, Agent, or Firm—Nils H. Ljungman & Associates

[57] ABSTRACT

The invention relates to detectors of ionizing radiation which use a photoconductor as the detecting element. The invention lies in an electrode moving in a direction OX through a photoconductive medium disposed between two grids of electrodes extending parallel to OX. During the irradiation time, the grid electrodes of one grid are raised to a positive potential relative to the electrodes of the other grid and electrons and positive ions are created in the photoconductor. The electrons are removed by maintaining the positive potential on the electrodes of said one grid for a period of time longer than the irradiation. During displacement of said moving electrode, only the positive ions give rise to current in the electrodes. The invention is applicable to radiotherapy and radiography.

5 Claims, 6 Drawing Sheets

PRIOR ART

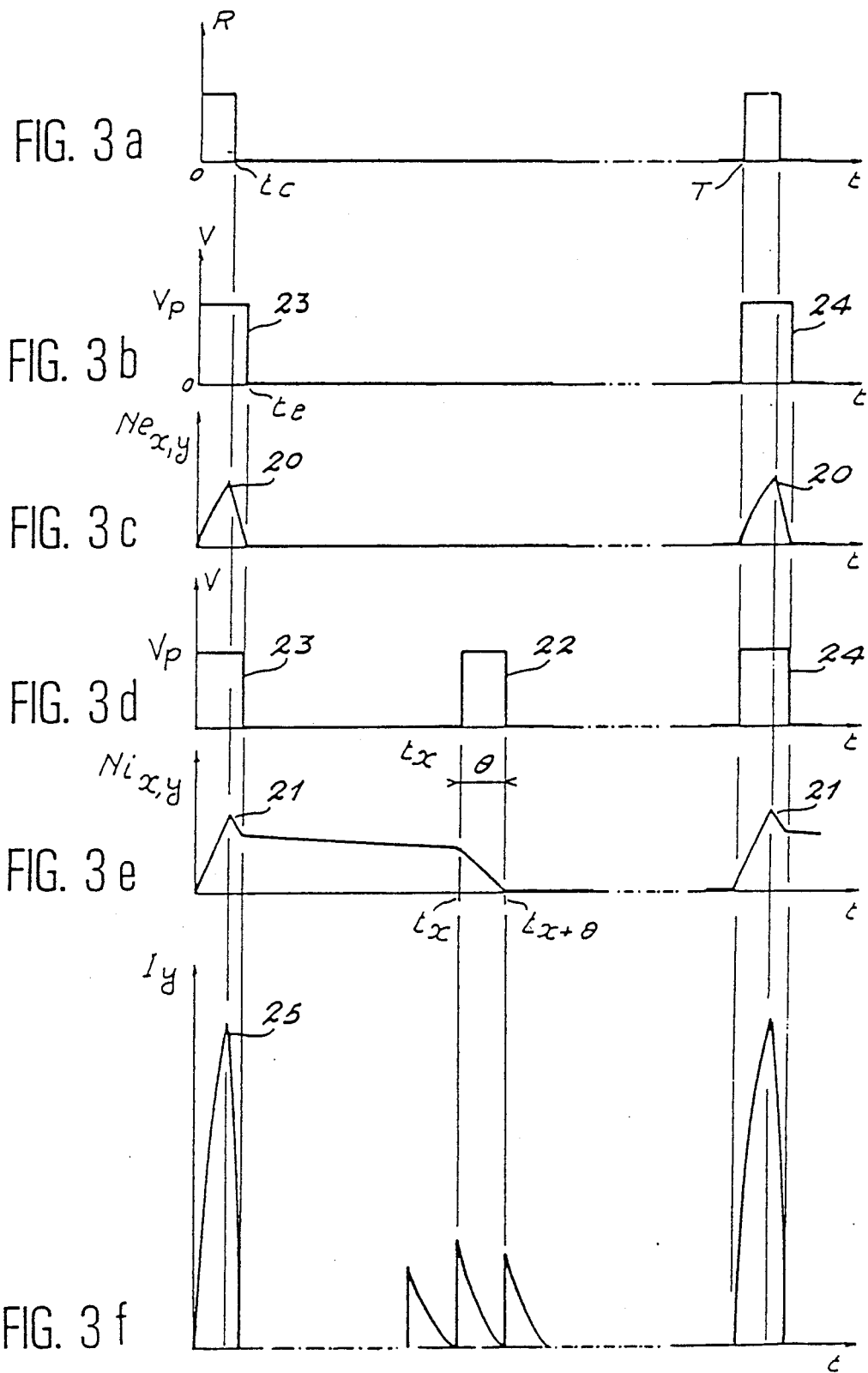

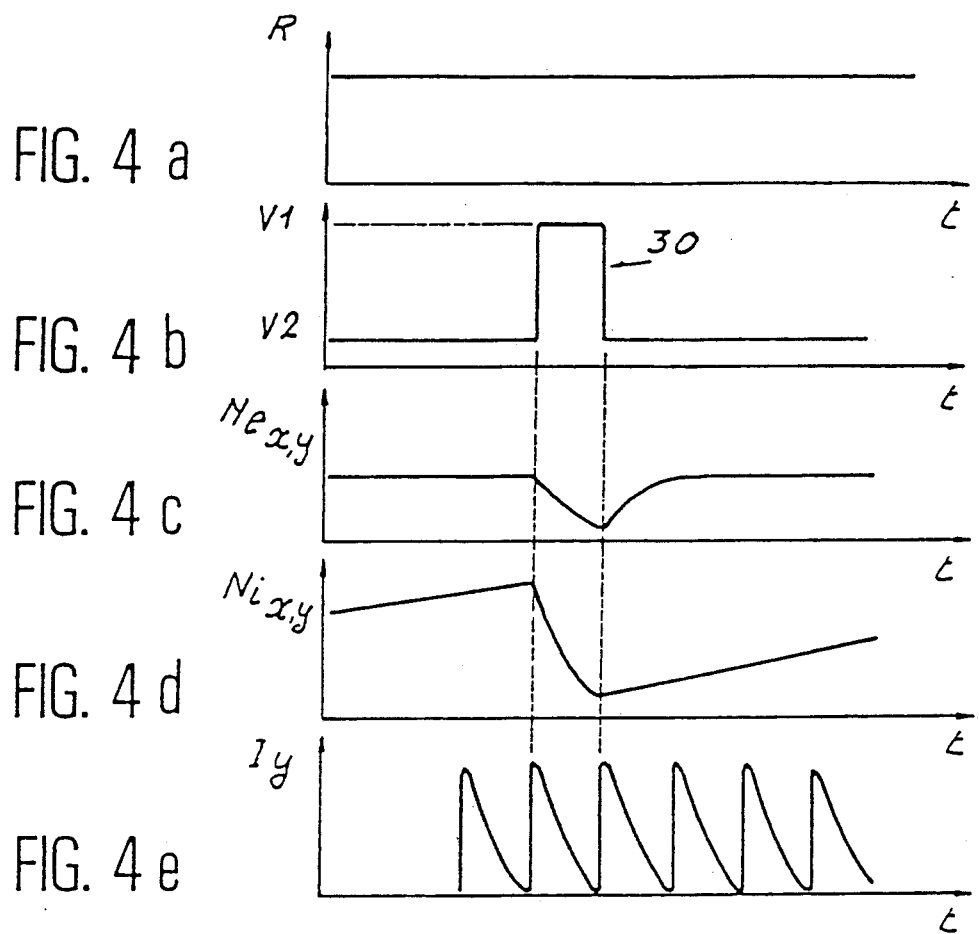
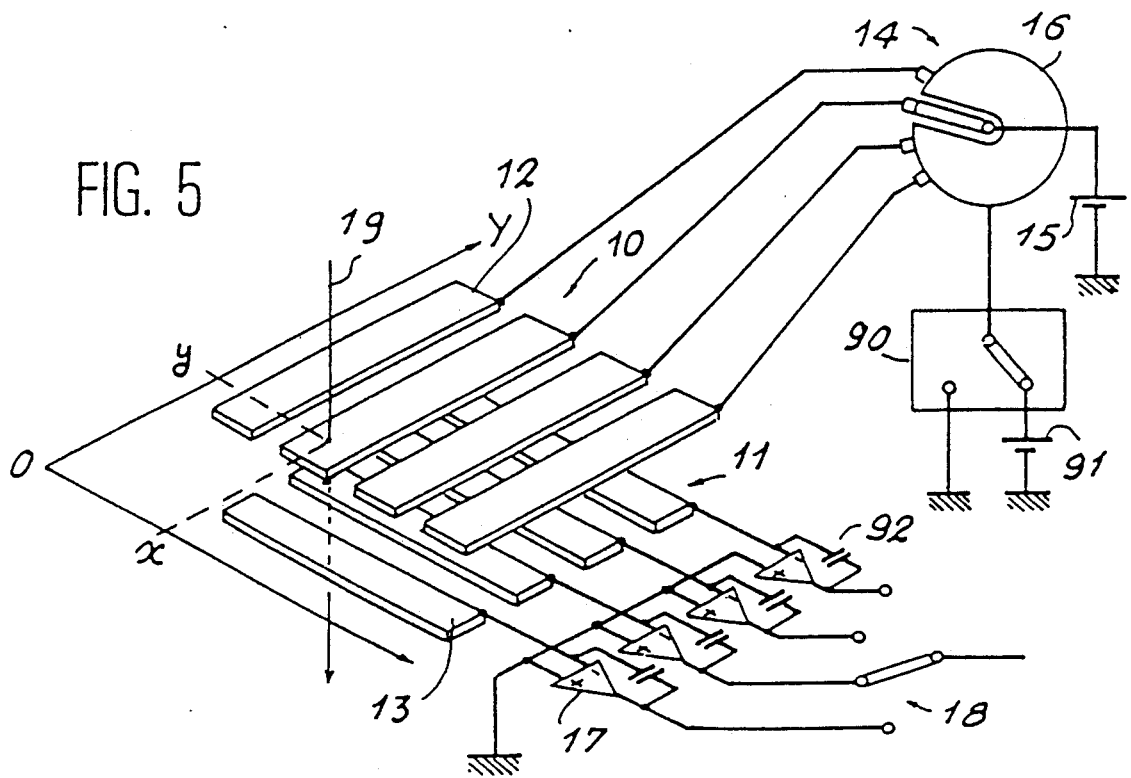

PHOTOCONDUCTIVE DETECTORS OF IONIZING RADIATION, AND METHODS OF IMPLEMENTATION

BACKGROUND OF THE INVENTION

The invention relates to detectors of ionizing radiation which use a photoconductor as a detector element.

Ionizing radiation detectors are used in numerous fields in order to provide an image of an object. Thus, for medical diagnosis, the body of a patient, or a portion thereof is irradiated with X-rays and the non-absorbed radiation is detected in order to make an image of the patient's skeleton.

In industrial testing, mechanical parts which are opaque to visible light are subjected to gamma rays or to X-rays having energy adapted to the absorption of the part under test, and the resulting image can be used for detecting faults such as microfractures.

In radiotherapy, the portion of the body to be treated is irradiated by beta or gamma radiation and non-absorbed radiation is used for forming an image of the treated portion and of its environment. This makes it possible to verify the patient's position and to change it if necessary so that the radiation does indeed reach the portion of the body to be treated, and that portion only.

The detectors in widest use are the following: a silver-based film which is generally used in association with a screen that transforms the ionizing radiation into radiation that marks the film; an X-ray image intensifier which is constituted by a vacuum tube containing a screen which transforms the ionizing radiation into light radiation, the tube also contains a photocathode which transforms the light radiation into electrons, and electron optics means for forming an electron image of the cathode on a screen which in turn transforms it into a light image; and a photoconductive detector which transforms the image formed by the ionizing radiation into an image constituted by a distribution of electric charge, with the commonest detector of this type being a xerographic plate where the photoconductor is selenium and where the electric charge distribution image is displayed by attracting an opaque powder (called "toner") onto a suitable medium.

Another photoconductive detector is described in the article entitled: "A liquid ionization detector for digital radiography of therapeutic megavoltage photon beams" by H. Meertens, et al, published in the Journal Phys. Med. Biol., 1985-Vol. 30, No. 4, at pages 313 to 321. As shown in FIG. 1, this detector comprises two grids 10 and 11 of linear electrodes 12 and 13 disposed in parallel planes. The electrodes within each grid are parallel to each other and perpendicular to the electrodes in the other grid. A photoconductive material (not shown) such as 2,2,4-trimethylpentane is disposed between the two parallel planes.

The electrodes 12 of the first grid 10 are connected to a biasing circuit 14 constituted by a voltage source 15 and a sequencer circuit 16. This circuit enables each of the electrodes in the first grid 10 to be biased relative to the electrodes 13 in the second grid 11 in such a manner that only one electrode is biased at a time, with the others remaining at the same potential as the second grid.

Each of the electrodes 13 in the second grid 11 is connected to an electrical charge measuring circuit 17 which memorizes its measurement. The read circuit 17 is essentially constituted by a current amplifier including a feedback capacitor 92. A sequencer circuit 18 serves to interrogate the measuring circuits 17 sequentially. In FIG. 1, arrow 19 indicates the propagation direction of the ionizing radiation.

The operation of such a photoconductive detector is now explained with reference to FIGS. 2a to 2e which are signal waveform diagrams as a function of time t. In these figures, the index x represents a magnitude relating to an electrode in the first grid 10 at position x in the X-Y co-ordinate system of FIG. 1. Similarly, the index y represents a magnitude relating to an electrode in the second grid 11, at position y in the X-Y co-ordinate system.

FIG. 2a shows the bias voltage as applied to the electrode at position x as a function of time.

FIG. 2b shows the bias voltage $V_{x+1}$ as applied to the adjacent electrode at position $x+1$, similarly as a function of time.

FIG. 2c shows the electric charge density $N_{x,y}$ as a function of time at points in the photoconductor which are at the position x,y when projected onto the plane of the X-Y co-ordinate system.

FIG. 2d shows the electric charge density $N_{x+1,y}$ as a function of time for points of the photoconductor at the position $x+1,y$ when projected onto the plane of the X-Y co-ordinate system.

Finally, FIG. 2e shows the current $I_y$ as measured on the electrode y in the second grid 11, as a function of time.

These various signal waveforms show that, at the instant when the electrode x in the first grid 10 is biased, the current $I_y$ measured on electrode x in the second grid 11 is proportional to the charge density $N_{x,y}$ at the cross-point between these electrodes: i.e. where the electrode x in the second grid 11 crosses the electrode x in the first grid 10.

In such a detector, the only radiation contributing to forming an image is the radiation received by that one of the electrodes in the first grid 10 which is polarized at a given instant, and this constitutes a low utilization level of the ionizing radiation. As a result image formation time is long and the object is subjected to a large amount of radiation.

SUMMARY OF THE INVENTION

The object of the invention is to provide a photo conductive detector of the type described above with reference to FIGS. 1 and 2, while avoiding the drawbacks thereof.

The present invention provides a photoconductive detector of ionizing radiation, comprising: a first grid of fixed electrodes disposed in a plane perpendicular to the direction of propagation of the radiation in an upstream position relative to said direction of propagation, said first electrode grid being capable of being sequentially connected either to a potential close to ground potential or slightly positive, or else to a high potential $V_p$; a second grid of electrodes disposed downstream from the first grid in a plane perpendicular to the direction of propagation of the ionizing radiation, said second grid being connected to read circuits; and photoconductive material disposed between the first and second grids, the photoconductive detector being characterized in that the said photoconductive material is selected to respond to the ionizing radiation by providing electrons of high mobility and positive ions of low mobility; and in that the detector includes means for connecting the first grid of electrodes to the high positive potential $V_p$ at least during the period of irradiation in order to capture the majority of the electrons, thereby avoiding recombination of said electrons with the positive ions.

When the radiation is in the form of pulses, the means for connecting the first grid of electrodes to the high positive potential Vp are also designed so that this connection continues for a sufficient length of time after the irradiation has ceased.

The invention also provides a photoconductive detector of ionizing radiation, characterized in that it comprises: photoconductive material in the form of a fluid contained in a enclosure having two opposite and mutually parallel main faces, said material being chosen to respond to the ionizing radiation by creating electrons of high mobility and positive ions of low mobility; a first grid of electrodes disposed on a first face of the enclosure upstream relative to the direction or propagation of the ionizing radiation and lying in a plane perpendicular to said direction, said first grid being suitable for being connected by a switch either to a high positive potential V3 during a period of time greater than the duration $t_c$ of the irradiation, or else to the input of a read circuit; a second grid of electrodes disposed on the second face of the enclosure, with the electrodes of the first and second grids being parallel and superposed in pairs, each of the electrodes of the second grid being connected to a read circuit; an electrode disposed in the photoconductive medium perpendicularly to the electrodes in the first and second grids and connected to a high positive potential V4; and means for displacing said electrode in the direction of the electrodes of the first and second grids, with the electrode being displaced between two irradiations of the detector and after the said high positive potential V3 has been applied to the electrodes of the first grid.

The invention also provides a photoconductive detector of ionizing radiation, characterized in that it comprises: a photoconductive material in the form of a fluid contained in a enclosure having two opposite mutually parallel main faces; a first electrode in the form of a metal plane disposed on one of the main faces of the enclosure; a second electrode in the form of a metal plane disposed on the other main face of the enclosure; a grid of electrodes disposed in a line, each electrode of said grid being connected to a read circuit disposed outside the enclosure; means for applying a first positive voltage V5 to said first and second electrodes and for intermittently applying a potential V6 slightly lower than the first potential V5 to said first electrode for a period of time greater than the irradiation time in order to capture the electrons; and means for displacing the grid of electrodes through the photoconductive medium, with the displacement taking place between two irradiations of the detector and after the potential V6 has been applied to the first electrode.

BRIEF DESCRIPTION OF THE DRAWINGS

Other characteristics and advantages of the present invention appear from reading the following description of particular embodiments, with the description being made with reference to the accompanying drawings, in which:

FIGS. 3a to 3f are signal waveform diagrams showing a first new method of using the FIG. 1 detector for short-duration irradiation;

FIGS. 4a to 4e are signal waveform diagrams showing a second new method of using the FIG. 1 detector for long-duration or permanent irradiation;

FIG. 5 is a diagram of an embodiment suitable for implementing the method described with reference to FIGS. 3a to 3f;

DESCRIPTION OF PREFERRED EMBODIMENTS

Figure 1:
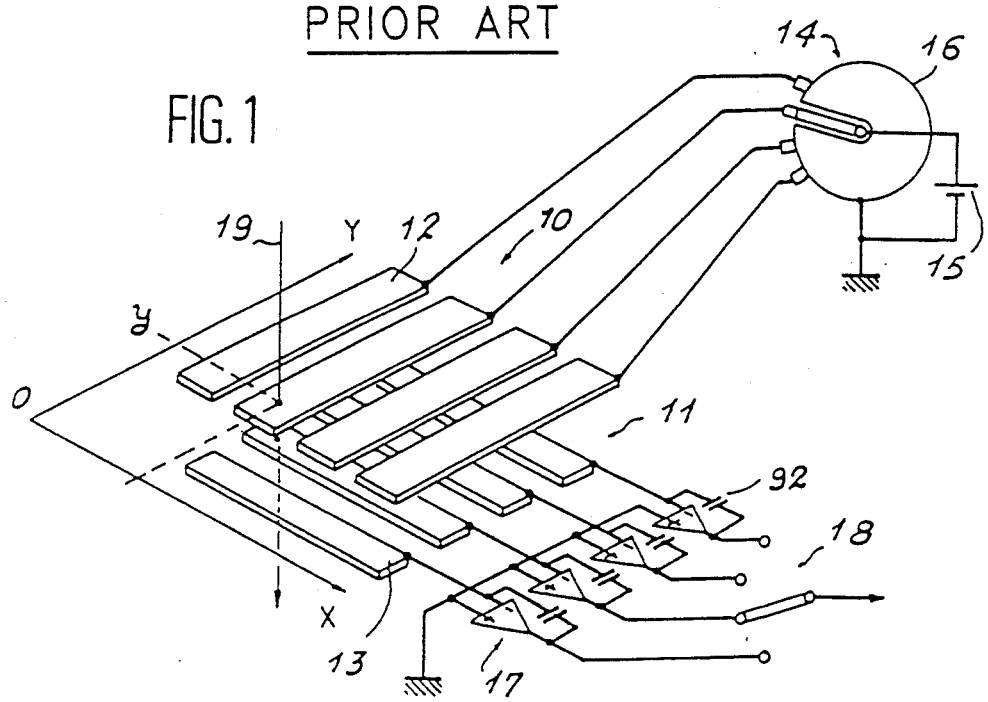
FIG. 1 is a diagram showing a prior art photoconductive detector.
Figure 2:
FIGS. 2a to 2e are signal waveform diagrams showing the operation of the FIG. 1 detector.
Figure 2:
Figure 2:
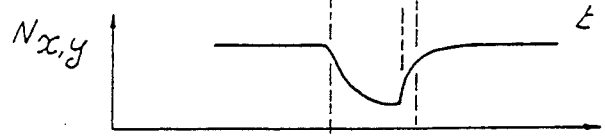
Figure 2:
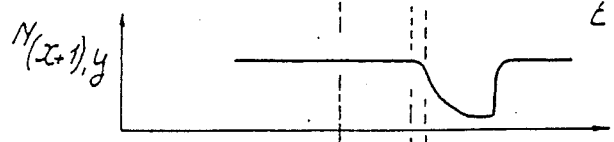
Figure 2:
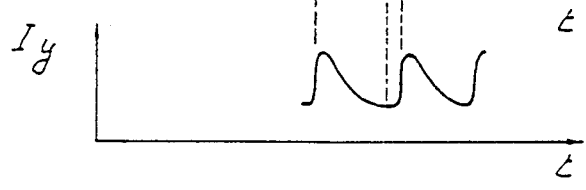

FIGS. 1 and 2 show a prior art photoconductive detector and they have already been described above.

As mentioned, the invention proposes two novel methods of using the FIG. 1 photoconductive detector, which methods are described with reference to FIGS. 3, 4, and 5. In addition, the invention also proposes two novel photoconductive detectors which are described with reference to FIGS. 6 to 9.

Both in the novel methods and in the novel detectors, the invention proposes choosing a photoconductor in which the lifetime of at least one of the electric charge carriers is long and in which a large number of positive ions and electrons are formed, with negative ions being avoided. In addition, a special sequence is proposed for biasing the electrodes to increase the lifetime of the positive ions by eliminating the electrons before measuring the charges created by the positive ions.

The first novel method is described with reference to the waveform diagrams of FIGS. 3a to 3f, and it corresponds to short-duration irradiation from time $t=0$ to time $t=t_c$ and repeated with a period T. Waveform diagram 3a shows the intensity R of the radiation in the form of pulses of duration $t_c$ and period T.

FIG. 3b shows the voltage bias pulses $V_p$ applied simultaneously to the electrodes 12 of the first grid 10. These pulses are synchronized with the radiation pulses and their duration is slightly longer, running from $t=0$ to $t=t_e$ where $t_e > t_c$.

While ionizing radiation is present simultaneously with a bias pulse on the electrodes in the first grid 10, the charge densities both in electrons Ne and in positive ions Ni (assumed to be zero in each elementary volume of the photoconductor called "pixels" at instant $t=0$), increase and take up a value substantially proportional to the received radiation. For the pixel having co-ordinates x and y (FIG. 1), the accumulated charge densities $Ne_{x,y}$ and $Ni_{x,y}$ are shown respectively by the diagrams of FIGS. 3c and 3e, and more particularly by the peaks 20 and 21.

Since the bias pulse lasts longer than the irradiation pulse and since electron mobility is greater than the mobility of positive ions, all of the electrons are captured by the electrodes of the first grid 10 during the time interval $t=t_c$ to $t=t_e$ such that at $t=t_e$ $N_{x,y}=0$. However, the electrodes in the second grid, capture only a small fraction of the positive ions, thereby reducing $Ni_{x,y}$ only a little, such that at instant $t_e$, a large fraction of positive ions remains compared with the number present at instant $t_c$. In order to measure the density $Ni_{x,y}$, the method consists in applying a bias voltage $V_p$ to the first grid electrode at position x and in making a connection to the output of the read circuit corresponding to the second grid electrode at position y. For the x position electrode, this voltage is represented by the pulse 22 in the waveform diagram of FIG. 3d, with the other two pulses 23 and 24 representing the pulses that are synchronized with the irradiation (FIG. 3b). This pulse 22 of duration $\theta$ appears at a determined instant $t_x$ within the period of duration T between the two pulses 23 and 24, with the particular instant depending on which x electrode is selected.

This bias pulse 22 serves to discharge the pixel of all the positive ions it still containes at instant $t = t_x$.

Between the instants $t = t_e$ and $t = t_x$, the quantity of charge $Ni_{x,y}$ falls off due to the short lifetime of positive ions. However, in accordance with the invention, this lifetime is considerably lengthened by virtue of the electrons in the photoconductor being eliminated between instants $t = t_e$ and $t = t_c$, thereby eliminating the main cause of positive ions disappearing, i.e. electron-ion recombination. The other causes of ion disappearance remain, in particular diffusion and ions attaching to negative impurities, but they are smaller in effect.

During the time interval $t = t_e$ to $t = T$, the electrodes in the first grid 10 are biased sequentially, each for a period $\theta$.

If there are m electrodes in the first grid, then the length of time $\theta$ is such that:

$$\theta < (T - t_e)/m$$

In addition, this period of time $\theta$ and the bias voltage applied are selected so as to ensure that $Ni_{x,y}$ is substantially zero at instant $t = t_{x+\theta}$.

The diagram of FIG. 3f shows the current $I_y$ on an electrode in the second grid at position y as measurement takes place and pulses 22 are applied. From instant $t = 0$ to instant $t = t_c$, the current $I_y$ increases to a maximum value (peak 25) because of charges being created by the irradiation while all of the electrodes in the first grid are biased.

From instant $t = t_c$ to $t = t_e$, the current $I_y$ falls off by virtue of the created charges being entrained to the electrodes in the first and second grids.

From instant $t = t_e$ to $t = T$, the current $I_y$ takes a value which varies as a function of the time $t_x$ at which the pulses 22 appear and as a function of the charge densities $Ni_{x,y}$, which densities are a function of the radiation received by the corresponding pixel. As a result, the quantity of charge $Q_{x,y}$ corresponding to the currents $I_y$ being integrated between instants $t = t_x$ and $t = t_{x+\theta}$ constitutes a measurement of the irradiation of the pixel having co-ordinates x,y.

In order to perform the above-described method, it is necessary to modify the diagram of FIG. 1 a little by adding a switch 90 (FIG. 5) which enables all of the electrodes 12 to be connected either to a positive potential $V_p$ for a length of time $t_e$, or else to ground for the remainder of the period T. The positive potential $V_p$ is represented by a battery 91.

If the detector is continuously irradiated, the method is performed and the detector operates as explained below with reference to FIGS. 4a to 4e. FIG. 4a represents the unchanging level of the irradiation R as a function of time. The waveform diagram of FIG. 4b represents the electric signals that are applied to the electrode 12 in the first grid 10. These electrodes are permanently biased to a potential V2, since the irradiation R is permanent, except for periods of time $\theta$ constituted by read pulses 30 at potential V1. The potential V2 has the effect of entraining electrons and therefore preventing electron density $Ne_{x,y}$ (FIG. 4c) from becoming too high. The potential V2 should be chosen so as to be sufficiently low to avoid entraining positive ions significantly.

During the read pulse 30 at potential V1, the density $Ne_{x,y}$ of electrons falls off and becomes zero very quickly.

With such continuous irradiation and polarization V2, the lifetime of ions is greater than the period T of the read pulses 30, and the density of positive ions $Ni_{x,y}$ does not reach its saturation value, such that the irradiation is used throughout the exposure time and not only during the very short time of a pulse.

The methods used in accordance with the invention as described above with reference to FIGS. 3, 4, and 5 are applicable to a detector of the type shown diagrammatically in FIGS. 1 and 5. In order to allow them to operate properly, certain conditions must be satisfied. In particular, it is necessary that during the time interval between a pixel being irradiated and that pixel being read, positive ions diffuse over a distance which is small compared with pixel size. This sets a maximum value on positive ion mobility.

In addition, each time a pixel is read, it is desirable to collect all of the positive ions present in the pixel, i.e. the positive ions must be capable of travelling the full distance between the two grids 10 and 11 of electrodes by the end of the pulse. These two conditions give rise to very high read voltages, of the order of 25 kilovolts, and this is difficult to implement in a detector as shown in FIGS. 1 and 5.

Thus, the invention also proposes other embodiments of the detector and these are described with reference to FIGS. 6 to 9.

Figure 6:
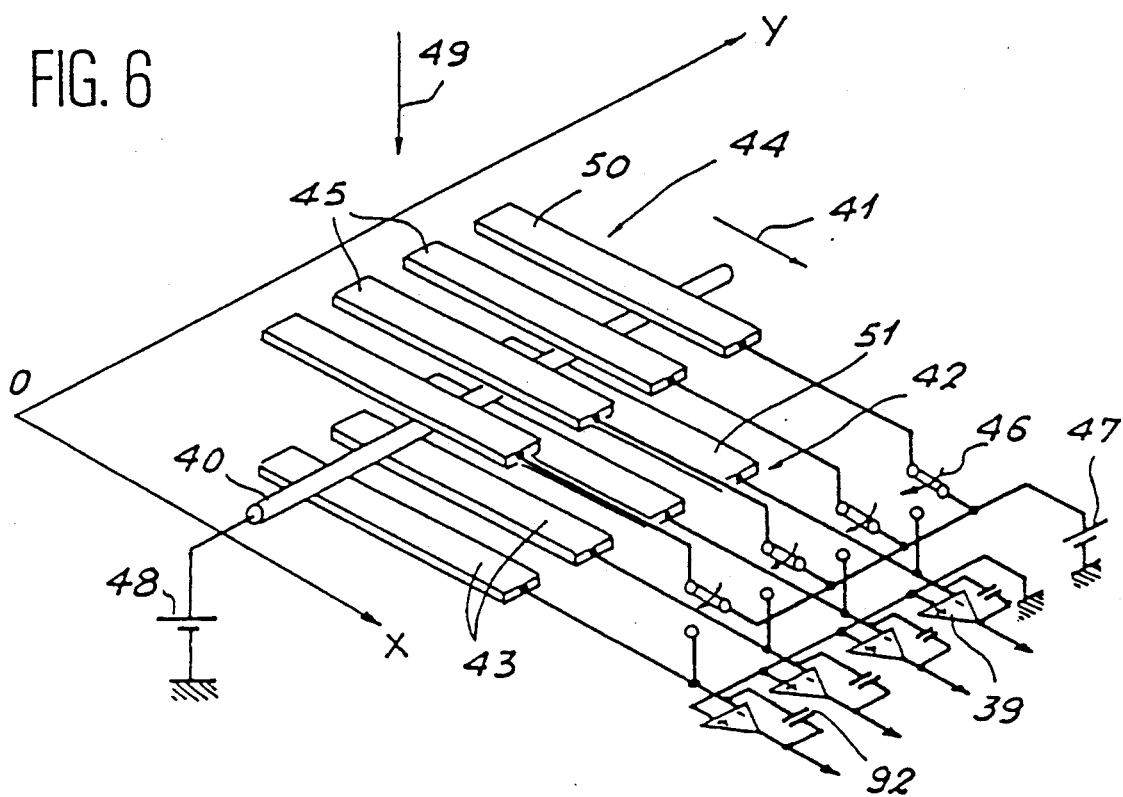
FIG. 6 is a diagram of an embodiment of a photoconductive detector in accordance with the invention.

In the embodiment shown in FIG. 6, the electrodes 12 of the grid 10 in FIG. 1 are functionally replaced by a single electrode 40 which is moveable in a direction (arrow 41) parallel to the direction in which the electrode 43 of a grid 42 extends, and in a plane parallel to said electrode. In order to increase the sensitivity of the detector, a second grid 44 of electrodes 45, similar to the grid 42, is disposed above the single electrode 40 and symmetrically about the plane in which the single electrode moves, with the electrodes in the two networks 42 and 44 being superposed in pairs. As in the example of FIG. 1, the electrodes 43 are connected to read circuits 39. The electrodes 45 are connected via switches 46 either to the read circuits 39, or else to a positive voltage source 47 at a potential V3. The single electrode 40 is connected to a source of positive voltage 48 at a potential V4.

Although not shown in FIGS. 1, 5, 6, and 7, the grids of electrodes are disposed at the periphery of an enclosure which contains a photoconductive material separating the grids. In the embodiment shown in FIG. 6, the photoconductive material must be liquid or gaseous so as to allow the electrode 40 to move.

The waveform diagrams of FIGS. 8a to 8h show the sequence of signals to be applied to the various electrodes and serve to explain how the detector of FIG. 6 operates.

The diagram of FIG. 8a shows pulses of radiation 52 as applied to the detector in the direction indicated by arrow 49, said pulses being of duration $t_c$ and having a period T. The diagram of FIG. 8b shows the signals which are applied to the electrodes 50. These signals comprise pulses 53 of amplitude V3, of period T, and of duration $t_e$ greater than $t_c$, which pulses are synchronized with the pulses 52. For the electrode adjacent to the electrode 50, the waveform diagram would be identical to that of FIG. 8b, but offset through time $t_c$.

The diagram of FIG. 8c shows the potential applied to the electrode grid 42, and in particular to the electrode 51. In this example, this potential is ground or close to the ground potential corresponding to the input of the read circuit 39.

The diagram of FIG. 8d shows the potential of the moving electrode 40. This potential V4 is positive relative to ground.

The diagram of FIG. 8e shows the variation in electron density Ne at an arbitrary point. This diagram is analogous to that of FIG. 3c.

The diagram of FIG. 8f shows the variation in the density of positive ions Ni at a point at position x. This diagram is analogous to that of FIG. 3e.

The diagram of FIG. 8g shows the position of the single moving electrode 40 along the axis OX.

Finally, the diagram of FIG. 8h shows the currents $I_{50}$ and $I_{51}$ measured on electrodes 50 and 51. In order to eliminate electrons after irradiation, the electrode grids 42 and 44 are biased relative to each other by a voltage source 47. For reading purposes, the electrode 40 is biased by the source 48 and it is displaced along the axis OX, and as it moves it sweeps away the positive ions present in the photoconductor towards the electrodes 43 and 45.

Figure 7:
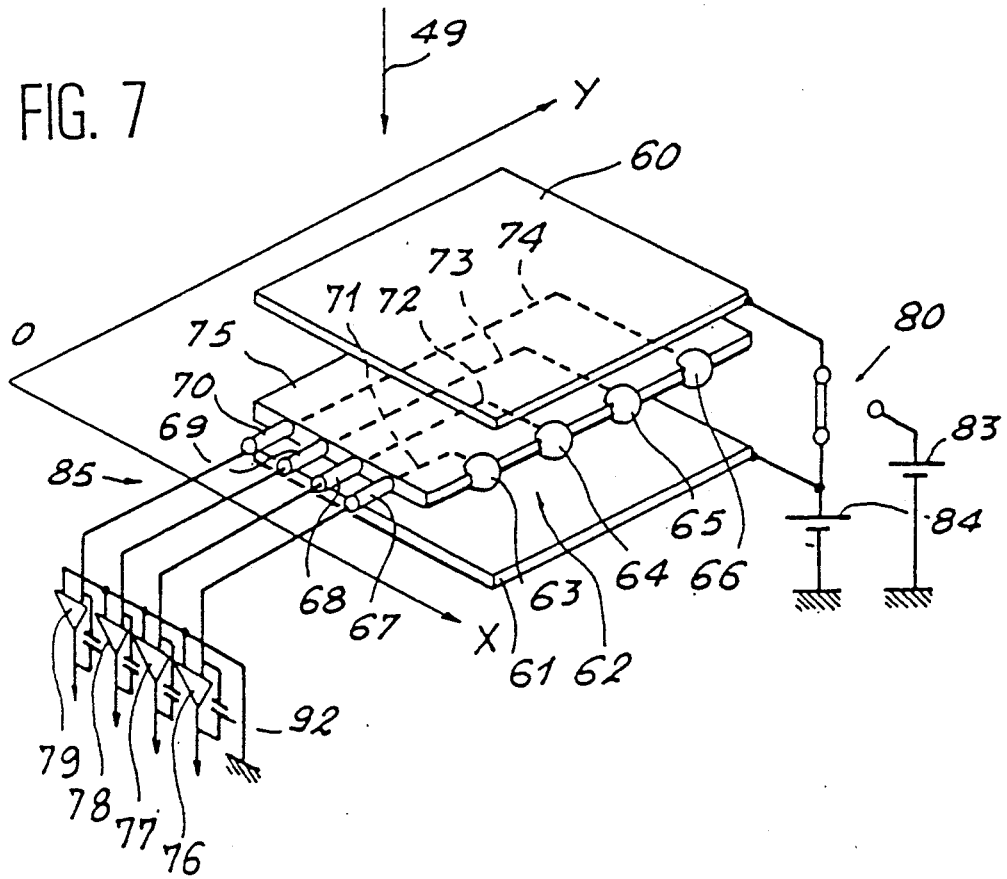
FIG. 7 is a diagram of a second embodiment of a photoconductive detector in accordance with the invention.
Figure 8:
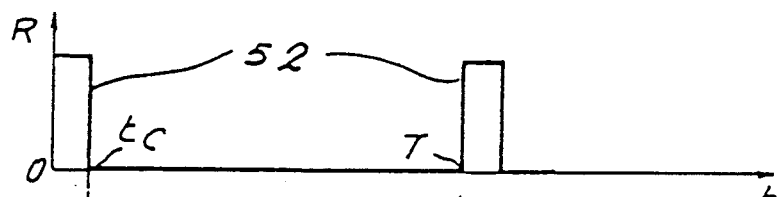
FIGS. 8a to 8h are signal waveform diagrams showing a method of using the FIG. 6 detector.
Figure 8:
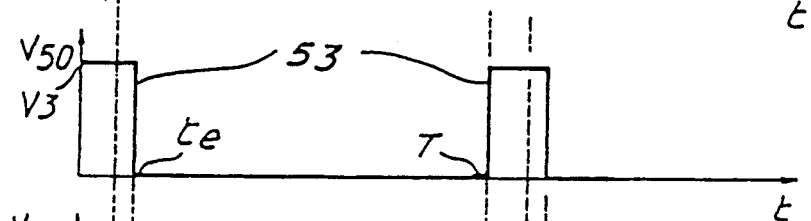
Figure 8:
Figure 8:
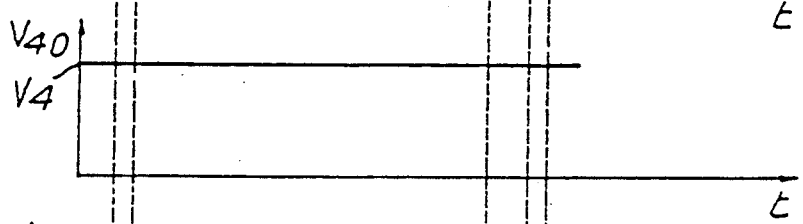
Figure 8:
Figure 8:
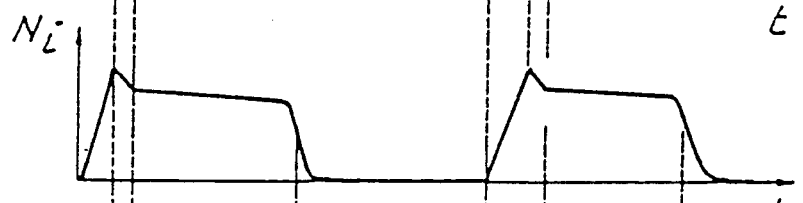
Figure 8:
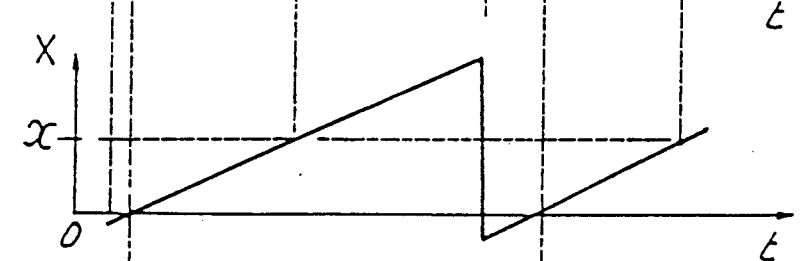
Figure 8:
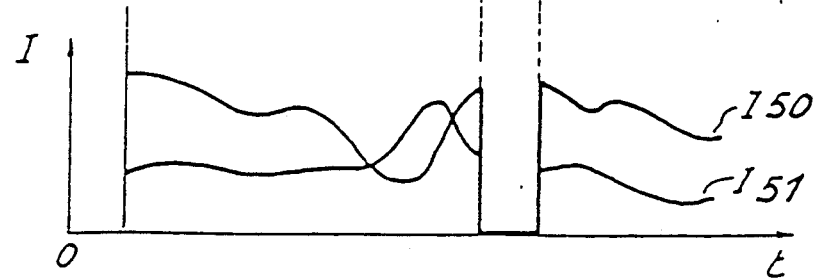

FIG. 7 is a diagrammatic representation of another embodiment of a detector in accordance with the present invention. In this example, the linear electrodes 43 and 45 of the FIG. 6 detector are replaced by respective conducting plates 60 and 61, while the moving electrode bar 40 is replaced by, a linear grid 62 of individual electrodes 63, 64, 65, and 66 which are small in size and preferably round in shape. Each electrode 63 and 66 is connected to a respective contact terminal 67 to 70 by electrical conductors 71 to 74 which are carried by an insulating plate 75 which also serves to support the elementary electrodes 63 to 66. The plate 75 is moveable in the direction OX, i.e. perpendicularly to the line passing through the four electrodes, and parallel to the electrode plates 60 and 61.

The terminals 67 to 70 are connected to respective read circuits 76 and 79 via flexible conductors 85 which leave the plate 75 free to move.

Figure 9:
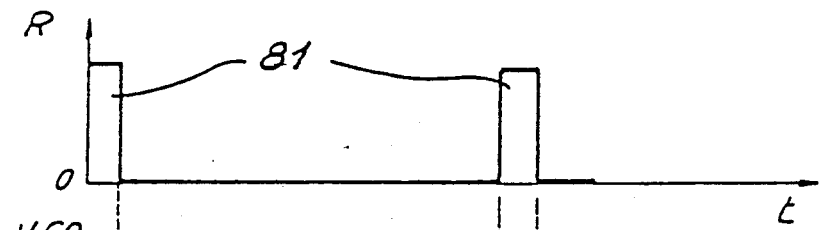
FIGS. 9a to 9h are signal waveform diagrams showing a method of using the FIG. 7 detector.
Figure 9:
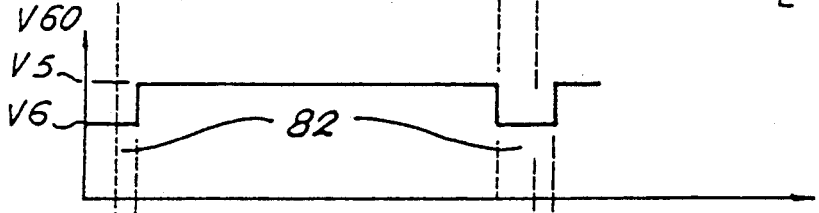
Figure 9:
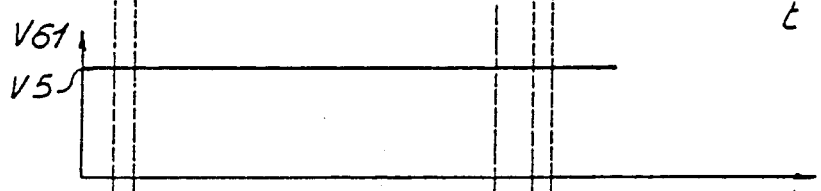
Figure 9:
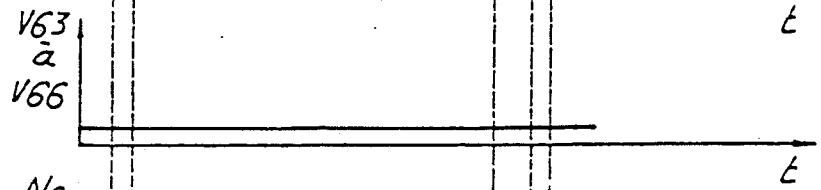
Figure 9:
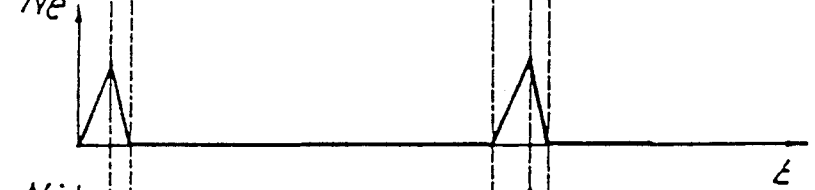
Figure 9:
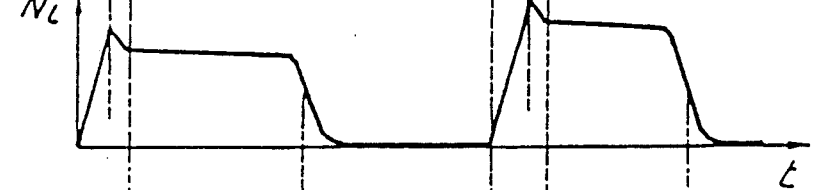
Figure 9:
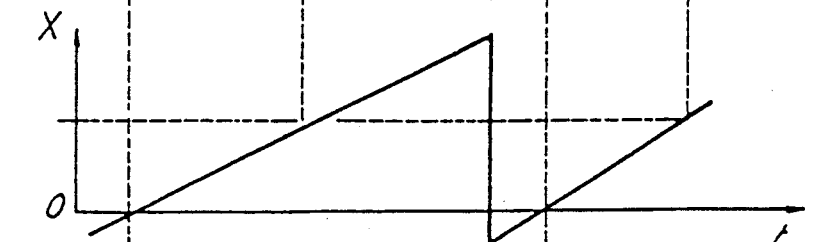
Figure 9:

The electrode 61 is connected directly to a positive voltage source 84 at a potential V5, whereas the electrode 60 is connected via a switch 80 either to the positive voltage source 84 or else to a positive voltage source 83 at a potential V6 which is lower than the potential V5 provided by the source 84, as explained below with reference to the waveform diagrams of FIG. 9.

FIG. 7 does not show the liquid or gaseous photo conductive material which is disposed between the electrodes 60 and 61 and through which the plate 75 moves. Nor does the figure show the enclosure which contains and supports the items described, nor does it show the mechanical means for displacing the plate 75 between the electrodes 60 and 61. The person skilled in the art is perfectly capable of making these items that are not shown, and they are not described in further detail herein.

The waveform diagrams of FIGS. 9a to 9h show the sequence of electrical signals to be applied to the various electrodes and explain how the detector of FIG. 7 operates.

The diagram of FIG. 9a shows the pulses of irradiation 81 applied to the detector in the direction indicated by arrow 49, said pulses being of duration $t_c$ and of period T.

The diagram of FIG. 9b shows the signals which are applied to the electrode 60 via the switch 80. Thus, this electrode is at the potential V6 provided by the source 83 (pulses 82) while the pulses 81 of irradiation are present, and it is at a potential V5 between the pulses 82. The duration $t_e$ of the pulses 82 is slightly greater than the duration $t_c$ of the pulses of irradiation so as to eliminate electrons after each pulse of irradiation.

The diagram of FIG. 9c shows the signal applied to the electrode 61, i.e. the potential V5 provided by the source 84.

The diagram of FIG. 9d shows the potential of the electrodes 63 to 66, i.e. a potential close to ground and corresponding to the input potential of the read circuits 76 to 79.

The diagram of FIG. 9e shows the variation in electron density Ne at an arbitrary point in the photoconductive medium. This diagram is analogous to the diagrams of FIGS. 3c and 8e.

The diagram of FIG. 9f shows the variation in the density of positive ions Ni at a point at position x. This diagram is analogous to the diagrams of FIGS. 3e and 8f.

The diagram of FIG. 9g shows the position of the linear grid 62 of electrodes along the axis OX.

Finally, the diagram of FIG. 9h shows the currents $I_{63}$ and $I_{66}$ measured on electrodes 63 and 66 during displacement of the plate 75, which displacement has the effect of attracting positive ions to the positive electrodes 63 to 66, and thus of giving rise to the currents $I_{63}$ and $I_{66}$ on electrodes 63 and 66.

The various embodiments of the detector of the invention as described above are compact and easy to manufacture. They do not include any semiconductor devices on the path of the radiation, and they are capable of operating with irradiation that is short in duration or that is continuous but weak.

The invention is particularly suitable for imaging devices used in radiotherapy or in radiography using gamma rays or beta rays.

In the figures showing the various embodiments, the various types of switch are shown diagrammatically, and it is clear that they are embodied, in fact, by electronic circuits well known to the person skilled in the art.

What is claimed is:

1. A photoconductive detector of ionizing radiation, the detector comprising:
   a first grid of fixed electrodes disposed in a plane perpendicular to the direction of propagation of the radiation in an upstream position relative to said direction of propagation, and means for connecting said first electrode grid sequentially either to a potential close to ground potential or slightly positive, or else to a high potential $V_p$;
   a second grid of electrodes disposed downstream from the first grid in a plane perpendicular to the direction of propagation of the ionizing radiation, said second grid being connected to read circuits; and photoconductive material disposed between the first and second grids, Wherein said photoconductive material is selected to respond to the ionizing radiation by providing electrons of high mobility and positive ions of low mobility; and Wherein said means for connecting said first grid of electrodes to high positive potential $V_p$ is connected at least during the period of irradiation in order to capture the majority of the electrons, thereby avoiding recombination of said electrons with the positive ions.

2. A detector according to claim 1, in which the irradiation is in the form of pulses of duration $t_c$, wherein said means for connecting the first grid of electrodes to said high positive potential $V_p$ are also designed so that this connection continues for a length of time after the irradiation has ceased sufficient to capture the majority of electrons.

3. A photoconductive detector of ionizing radiation comprising photoconductive material in the form of a fluid contained in an enclosure having two opposite and mutually parallel main faces, said material being chosen to respond to the ionizing radiation by creating electrons of high mobility and positive ions of low mobility;

a first grid of electrodes disposed on a first face of the enclosure upstream relative to the direction or propagation of the ionizing radiation and lying in a plane perpendicular to said direction, and means for connecting said first grid by a switch either to a high positive potential V3 during a period of time greater than the duration $t_c$ of the irradiation, or else to the input of a read circuit;

a second grid of electrodes disposed on the second face of the enclosure, with the electrodes of the first and second grids being parallel and superposed in pairs, each of the electrodes of the second grid being connected to a read circuit;

an electrode disposed in the photoconductive medium perpendicularly to the electrodes in the first and second grids and connected to a high positive potential V4; and means for displacing said disposed electrode in the direction of the electrodes of said first and second grids, with said electrode being displaced between two irradiations of the detector and after said high positive potential V3 has been applied to the electrodes of said first grid.

4. A photoconductive detector of ionizing radiation comprising:

a photoconductive material in the form of a fluid contained in an enclosure having two opposite mutually parallel main faces;

a first electrode in the form of a metal plane disposed on one of the main faces of said enclosure;

a second electrode in the form of a metal plane disposed on the other main face of said enclosure;

a grid of electrodes disposed in a line, each electrode of said grid being connected to a read circuit disposed outside said enclosure;

means for applying a first positive voltage V5 to said first and second electrodes and for intermittently applying a potential V6 lower than the first potential V5 to said first electrode for a period of time greater than the irradiation time in order to capture the electrons; and means for displacing said grid of electrodes through the photoconductive medium, with the displacement taking place between two irradiations of the detector and after the potential V6 has been applied to the first electrode.

5. A photoconductive detector arrangement for detecting ionizing radiation, said photoconductive detector arrangement comprising:

a first plurality of electrodes;

means for charging said first plurality of electrodes to at least one of: a substantially ground potential, a potential substantially close to said ground potential, and a high potential;

a second plurality of electrodes;

a photoconductive material disposed between said first plurality of electrodes and said second plurality of electrodes;

said photoconductive material being selected such that, when exposed to the ionizing radiation, said photoconductive material generates electrons of a relatively high mobility and positive ions of a relatively low mobility; and means for charging said first plurality of electrodes to a substantially high positive potential during a period of exposure of said photoconductive material to the ionizing radiation.

* * * * *